US011961344B2

(12) United States Patent
Kincaid et al.

(10) Patent No.: US 11,961,344 B2
(45) Date of Patent: Apr. 16, 2024

(54) ULTRA-WIDEBAND ACCESSORY DEVICES FOR RADIO FREQUENCY INTENT DETECTION IN ACCESS CONTROL SYSTEMS

(71) Applicant: Schlage Lock Company LLC, Carmel, IN (US)

(72) Inventors: Ryan C. Kincaid, Indianapolis, IN (US); David Brown, Greenwood, IN (US); Joseph Land, Danville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 198 days.

(21) Appl. No.: 17/371,734

(22) Filed: Jul. 9, 2021

(65) Prior Publication Data

US 2023/0010267 A1 Jan. 12, 2023

(51) Int. Cl.
*G07C 9/00* (2020.01)

(52) U.S. Cl.
CPC ..... *G07C 9/00309* (2013.01); *G07C 2209/63* (2013.01)

(58) Field of Classification Search
None
See application file for complete search history.

(56) References Cited

U.S. PATENT DOCUMENTS 6,720,861 B1 4/2004 Rodenbeck et al.
8,319,605 B2 11/2012 Hassan et al.
9,196,104 B2 11/2015 Dumas et al.
9,218,696 B2 12/2015 Dumas et al.
9,336,637 B2 5/2016 Neil et al.
(Continued)

FOREIGN PATENT DOCUMENTS

CN 102906360 A 1/2013
CN 107945316 A 4/2018
(Continued)

OTHER PUBLICATIONS

International Search Report; International Searching Authority; International Patent Application No. PCT/US2022/036677; dated Oct. 13, 2022; 2 pages.
(Continued)

*Primary Examiner* — Carlos Garcia
(74) *Attorney, Agent, or Firm* — Taft Stettinius & Hollister LLP

(57) ABSTRACT

A system according to one embodiment includes an access control device comprising a lock mechanism configured to secure access to a passageway, and a UWB accessory device configured to receive a credential of the mobile device via Bluetooth communication, determine, using UWB ranging of the UWB accessory device, a location of a mobile device relative to the passageway secured by the lock mechanism of the access control device, determine whether a user of the mobile device intends to access the passageway based on the determined location of the user relative to the passageway, and communicate an indication that the user intends to access the passageway to the electronic lock via Bluetooth communication, and wherein the access control device is configured to unlock the lock mechanism in response to the indication that the user intends to access the passageway.

20 Claims, 5 Drawing Sheets

(56) References Cited

U.S. PATENT DOCUMENTS

| | | | | |
|---|---|---|---|---|
| 9,378,598 | B2 | 6/2016 | Dumas et al. | |
| 9,512,643 | B1 | 12/2016 | Keefe | |
| 9,970,229 | B1 | 5/2018 | Favila et al. | |
| 10,453,281 | B1 | 10/2019 | Lopez et al. | |
| 10,619,380 | B2 | 4/2020 | Ahearn et al. | |
| 10,719,999 | B2 | 7/2020 | Love et al. | |
| 10,759,389 | B2 | 9/2020 | Ledvina et al. | |
| 10,760,332 | B2 | 9/2020 | Kincaid et al. | |
| 11,562,609 | B2 | 1/2023 | Prostko et al. | |
| 11,663,864 | B2 * | 5/2023 | Kincaid | H04W 4/021 340/5.31 |
| 2002/0067259 | A1 | 6/2002 | Fufidio et al. | |
| 2005/0046546 | A1 | 3/2005 | Masudava | |
| 2006/0164208 | A1 | 7/2006 | Schaffzin et al. | |
| 2009/0002246 | A1 | 1/2009 | Rabinovich et al. | |
| 2010/0201482 | A1 | 8/2010 | Robertson et al. | |
| 2012/0032850 | A1 | 2/2012 | Nakagawa et al. | |
| 2012/0234058 | A1 | 9/2012 | Neil et al. | |
| 2013/0176107 | A1 | 7/2013 | Dumas et al. | |
| 2013/0237193 | A1 | 9/2013 | Dumas et al. | |
| 2013/0241694 | A1 | 9/2013 | Sharma et al. | |
| 2014/0148196 | A1 | 5/2014 | Bassan-Eskenazi et al. | |
| 2014/0292481 | A1 | 10/2014 | Dumas et al. | |
| 2015/0121465 | A1 | 4/2015 | Berns et al. | |
| 2015/0213663 | A1 | 7/2015 | Dumas et al. | |
| 2015/0309487 | A1 | 10/2015 | Lyman | |
| 2016/0055692 | A1 | 2/2016 | Trani | |
| 2016/0086400 | A1 | 3/2016 | Dumas et al. | |
| 2016/0180620 | A1 | 6/2016 | Eyring et al. | |
| 2016/0189453 | A1 | 6/2016 | Johnson et al. | |
| 2016/0217638 | A1 | 7/2016 | Child et al. | |
| 2016/0227362 | A1 | 8/2016 | Howard et al. | |
| 2016/0307385 | A1 | 10/2016 | Arfwedson et al. | |
| 2016/0332598 | A1 | 11/2016 | Ghabra et al. | |
| 2016/0337863 | A1 | 11/2016 | Robinson et al. | |
| 2016/0350992 | A1 | 12/2016 | Telljohann et al. | |
| 2017/0303090 | A1 | 10/2017 | Stitt et al. | |
| 2017/0323093 | A1 | 11/2017 | Liu et al. | |
| 2017/0372542 | A1 | 12/2017 | Romero et al. | |
| 2018/0052217 | A1 | 2/2018 | Jonsson | |
| 2018/0056939 | A1 | 3/2018 | van Roermund et al. | |
| 2018/0102008 | A1 | 4/2018 | Dupart et al. | |
| 2018/0162321 | A1 | 6/2018 | Spiess | |
| 2018/0242105 | A1 | 8/2018 | Sute | |
| 2018/0315262 | A1 | 11/2018 | Love et al. | |
| 2020/0168017 | A1 | 5/2020 | Prostko et al. | |
| 2020/0314651 | A1 | 10/2020 | Pirch et al. | |
| 2021/0158637 | A1 * | 5/2021 | Kincaid | G07C 9/00182 |
| 2023/0010267 | A1 * | 1/2023 | Kincaid | G07C 9/00309 |
| 2023/0213637 | A1 | 7/2023 | Brown et al. | |

FOREIGN PATENT DOCUMENTS

| | | | |
|---|---|---|---|
| EP | 2930071 | A1 | 10/2015 |
| WO | 2014155255 | A1 | 10/2014 |
| WO | 2016177666 | A1 | 11/2016 |
| WO | 2017180563 | A1 | 10/2017 |
| WO | 2017180688 | A1 | 10/2017 |
| WO | 2018071671 | A2 | 4/2018 |
| WO | 2020083750 | A1 | 4/2020 |
| WO | 2020193566 | A1 | 10/2020 |

OTHER PUBLICATIONS

Written Opinion; International Searching Authority; International Patent Application No. PCT/US2022/036677; dated Oct. 13, 2022; 9 pages.

Angle of arrival; Wikipedia; https://en.wikipedia.org/wiki/Angle_of_arrival; (last visited Apr. 27, 2017). Feb. 26, 2016.

Intemational Search Report; International Searching Authority; International Patent Application No. PCT/US2018/029781; dated Jul. 13, 2018; 3 pages.

Written Opinion; International Searching Authority; International Patent Application No. PCT/US2018/029781; dated Jul. 13, 2018; 7 pages.

International Search Report; International Searching Authority; International Application No. PCT/US2019/063843; dated Apr. 20, 2020; 2 pages.

Written Opinion of the International Searching Authority, International Searching Authority; International Application No. PCT/US2019/063843; dated Apr. 20, 2020; 8 pages.

Shikiar, A. et al., The Future of Authentication for the Internet of Things, FIDO Alliance, Mar. 28, 2017, https://fidoalliance.org/wpcontenVuploads/The_Future_of_Authentication_for_IoT_Webinar_170328_v10.pdf, 56 pages.

Developing Beacons with Bluetooth Low Energy (BLE) Technology; Silicon Laboratories; http://www.silabs.com/products/wireless/bluetooth/developing-beacons-with-bluetooth-low-energy-ble-technology; (last visited Apr. 27, 2017).

Angle of arrival; Wikipedia; https://en.wikipedia.org/wiki/Angle_of_arrival; (last visited Apr. 27, 2017).

What do you want to track? Whatever you want to track, Quuppa brings you the dot on the map.; Quuppa—Do More With Location; http://quuppa.com/; (last visited Apr. 27, 2017).

Indoor Location Positioning Technology: Research, Solutions & Trends; Grizzly Analytics; http://www.grizzlyanalytics.com/report_2015_02_indoor.html; (last visited Apr. 27, 2017).

Front Page—Car Connectivity Consortium; Car Connectivity Consortium; retrieved on Jan. 13, 2021; https://carconnectivity.org/; 6 pages.

Volkswagen and NXP Show First Car Using UWB to Combat Relay Theft; EE Times; retrieved on Jan. 13, 2021; https://www.eetimes.com/volkswagen-and-nxp-show-first-car-using-uwb-to-combat-relay-theft/; 4 pages.

Car thefts up 49% in five years following advent of keyless-entry technology; The Sunday Times Driving; retrieved on Jan. 13, 2021; https://www.driving.co.uk/news/many-cars-sale-today-risk-keyless-theft-new-research-finds/; 6 pages.

Front Page—UWB Alliance; UWB Alliance; retrieved on Jan. 13, 2021; https://uwballiance.org/; 11 pages.

Alliance Rallies UWB for Location Services; EE Times; retrieved on Jan. 13, 2021; https://www.eetimes.com/alliance-rallies-uwb-for-location-services/; 2 pages.

UWB Alliance to focus on interoperability, further boosting the UWB ecosystem; FierceWireless; retrieved on Jan. 13, 2021; https://www.fiercewireless.com/wireless/uwb-alliance-to-focus-interoperability-further-boosting-uwb-ecosystem; 4 pages.

Front Page—FiRa Consortium; FiRa Consortium; retrieved on Jan. 13, 2021; https://www.firaconsortium.org/; 3 pages.

Introduction to the FiRa Consortium; FiRa Consortium; Aug. 1, 2019; 17 pages.

Ultra-Wideband (UWB) Gains Traction as a Sensing Technology Under New Industry Consortium; Forbes; retrieved on Jan. 13, 2021; https://www.forbes.com/...01/ultra-wideband-uwb-gains-traction-as-a-sensing-technology-under-new-industry-consortium/?sh=62102d366e21; 6 pages.

The Biggest iPhone News Is a Tiny New Chip Inside It; Wired; retrieved on Jan. 13, 2021; https://www.wired.com/story/apple-u1-chip/; 5 pages.

Apple built UWB into the iPhone 11. Here's what you need to know (FAQ); cnet; retrieved on Jan. 13, 2021; https://www.cnet.com/news/apple-built-uwb-into-the-iphone-11-heres-what-you-need-to-know-faq/; 6 pages.

Ultra-Wideband (UWB); NXP; retrieved on Jan. 13, 2021; https://www.nxp.com/applications/enabling-technologies/connectivity/ultra-wideband-uwb:UWB; 7 pages.

NXP Introduces Higher Security Using Ultra-Wideband Technology; Forbes; https://www.forbes.com/sites/tiriasresearch/2019/06/26/nxp-introduces-higher-security-using-ultra-wideband-technology/?sh=dc7565238410retrieved on Jan. 13, 2021; 5 pages.

Front Page—Decawave; Decawave; retrieved on Jan. 13, 2021; https://www.decawave.com/; 5 pages.

* cited by examiner

ULTRA-WIDEBAND ACCESSORY DEVICES FOR RADIO FREQUENCY INTENT DETECTION IN ACCESS CONTROL SYSTEMS

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, current credential systems generally require an interaction between the credential and a reader device (e.g., on or secured to the access control device) such that the reader device may read the credential and determine whether access should be granted. In particular, a user may be required to swipe, tap, or otherwise present the credential to the reader device. As such, access control systems often require an active physical action on behalf of the user in order to grant the user access via the access control device.

SUMMARY

One embodiment is a unique system, components, and methods for ultra-wideband (UWB)-based radio frequency intent detection. Other embodiments include apparatuses, systems, devices, hardware, methods, and combinations thereof for UWB-based radio frequency intent detection.

According to an embodiment, an access control system for ultra-wideband (UWB)-based radio frequency intent detection may include an electronic lock coupled to a barrier and including a first Bluetooth communication circuitry and a lock mechanism configured to secure access to a passageway, and a UWB accessory device comprising a UWB communication circuitry, a second Bluetooth communication circuitry, a processor, and a memory comprising a plurality of instructions stored thereon that, in response to execution by the processor, causes the UWB accessory device to receive, via the second Bluetooth communication circuitry, a credential of the mobile device, determine, using UWB ranging via the UWB communication circuitry, a location of a mobile device relative to the passageway, determine whether the user intends to access the passageway based on the determined location of the user relative to the passageway, and communicate, via a communication connection between the first Bluetooth communication circuitry and the second Bluetooth communication circuitry, an indication that the user intends to access the passageway to the electronic lock, wherein the electronic lock is configured to unlock the lock mechanism in response to receipt of the indication that the user intends to access the passageway.

In some embodiments, to determine the location of the mobile device relative to the passageway may include to determine the location of the mobile device relative to the UWB accessory device.

In some embodiments, the electronic lock may be further configured to automatically open the barrier to permit access to the passageway in response to unlock of the lock mechanism.

In some embodiments, the plurality of instructions may further cause the UWB accessory device to authenticate the credential of the mobile device in response to receipt of the credential from the mobile device.

In some embodiments, the electronic lock may be configured to authenticate the credential of the mobile device.

In some embodiments, the plurality of instructions may further cause the UWB accessory device to monitor for a Bluetooth communication signal from the mobile device, and to receive the credential of the mobile device may be in response to detecting the Bluetooth communication signal from the mobile device.

In some embodiments, the plurality of instructions may further cause the UWB accessory device to initialize UWB ranging of the UWB communication circuitry to determine the location of the mobile device relative to the UWB accessory device in response to detection of the Bluetooth communication signal from the mobile device.

In some embodiments, the UWB accessory device may be stationary and positioned in a same geometric plane as the electronic lock.

In some embodiments, the UWB accessory device may be a standalone ranging device.

In some embodiments, the UWB accessory device may include a doorbell.

In some embodiments, the UWB accessory device may include a camera.

In some embodiments, the UWB accessory device may include a door position sensor.

According to another embodiment, a method for ultra-wideband (UWB)-based radio frequency intent detection may include receiving a credential of the mobile device via Bluetooth communication, determining, using UWB ranging of a UWB accessory device, a location of a mobile device relative to a passageway secured by a lock mechanism of an access control device, determining whether a user of the mobile device intends to access the passageway based on the determined location of the user relative to the passageway, and communicating an indication that the user intends to access the passageway from the UWB accessory device to the electronic lock via Bluetooth communication.

In some embodiments, the method may further include unlocking, by the access control device, the lock mechanism in response to receiving the indication that the user intends to access the passageway.

In some embodiments, the method may further include automatically opening a barrier to permit access to the passageway in response to unlocking the lock mechanism.

In some embodiments, the method may further include authenticating the credential of the mobile device in response to receiving the credential from the mobile device.

In some embodiments, the method may further include monitoring for a Bluetooth communication signal from the mobile device, and receiving the credential of the mobile device may include receiving the credential of the mobile device in response to detecting the Bluetooth communication signal from the mobile device.

In some embodiments, the method may further include initializing UWB ranging of the UWB accessory device to determine the location of the mobile device relative to the UWB accessory device in response to detecting the Bluetooth communication signal from the mobile device.

According to yet another embodiment, a system for ultra-wideband (UWB)-based radio frequency intent detection may include an access control device comprising a lock mechanism configured to secure access to a passageway, and a UWB accessory device configured to receive a credential of the mobile device via Bluetooth communication, determine, using UWB ranging of the UWB accessory device, a location of a mobile device relative to the passageway secured by the lock mechanism of the access control device, determine whether a user of the mobile device intends to access the passageway based on the determined location of the user relative to the passageway, and communicate an indication that the user intends to access the passageway to the electronic lock via Bluetooth communication, wherein the access control device is configured to unlock the lock mechanism in response to the indication that the user intends to access the passageway.

In some embodiments, the UWB accessory device may be further configured to monitor for a Bluetooth communication signal from the mobile device, wherein to receive the credential of the mobile device is in response to detecting the Bluetooth communication signal from the mobile device and initialize UWB ranging of the UWB accessory device to determine the location of the mobile device relative to the UWB accessory device in response to detection of the Bluetooth communication signal from the mobile device.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
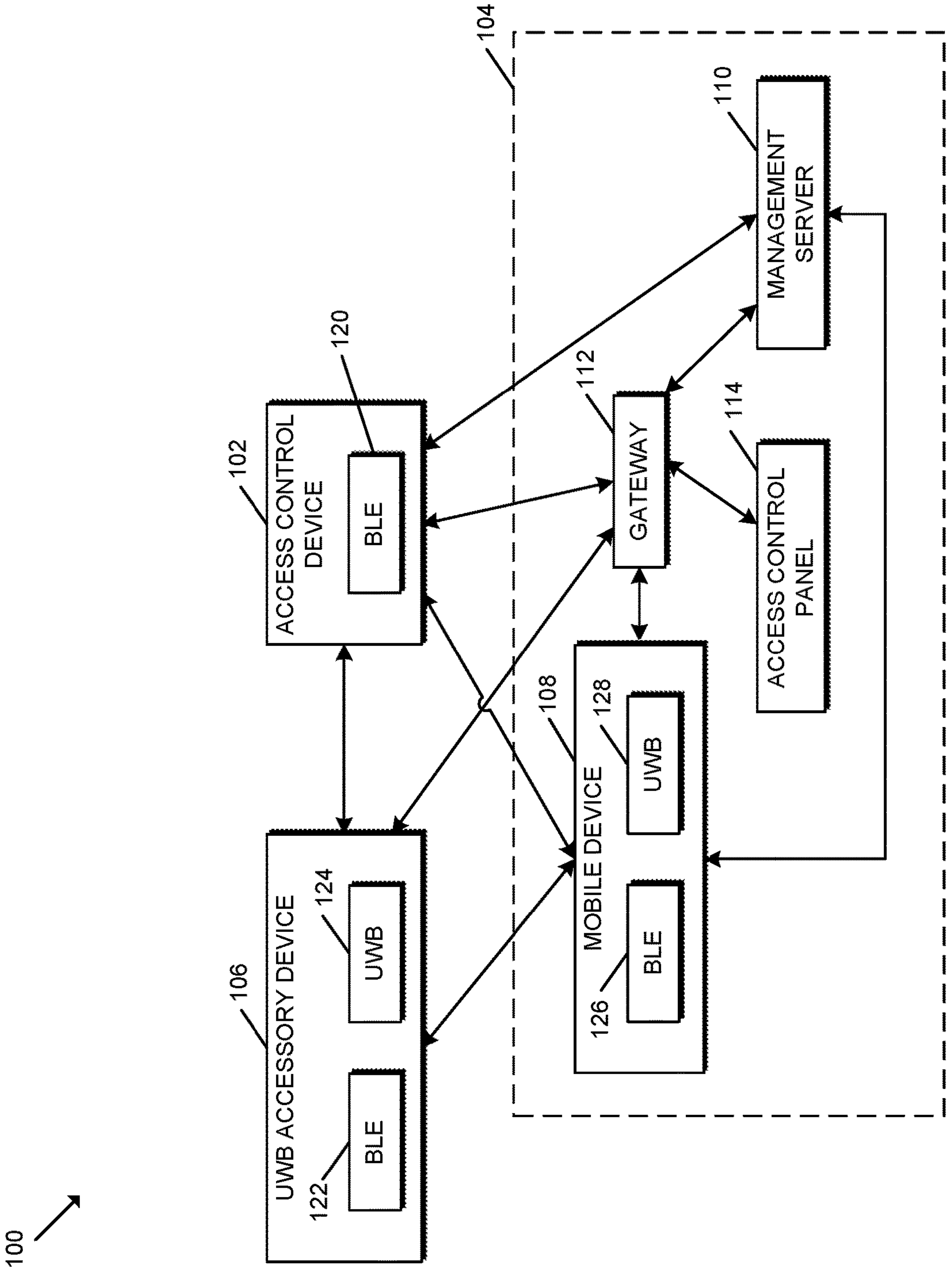
FIG. 1 is a simplified block diagram of at least one embodiment of an access control system for UWB-based radio frequency intent detection.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 for ultra-wideband (UWB)-based radio frequency intent detection includes an access control device 102, a management system 104, and a UWB accessory device 106. Further, the management system 104 may include a mobile device 108, a management server 110, a gateway device 112, and/or an access control panel 114. As shown, in the illustrative embodiment, the access control device 102 includes a Bluetooth Low Energy (BLE) communication circuitry 120, the UWB accessory device 106 includes a BLE communication circuitry 122 and a UWB communication circuitry 124, and the mobile device 108 includes a BLE communication circuitry 126 and a UWB communication circuitry 128.

As described in detail below, in the illustrative embodiment, the access control system 100 may control access to a passageway (e.g., through a doorway) via an access control mechanism (e.g., of the access control device 102) based on an intent of the user of the mobile device 108 (e.g., a smartphone) inferred based on UWB communications between the mobile device 108 and the UWB accessory device 106. In particular, the UWB accessory device 106 may monitor for a nearby mobile device (e.g., the mobile device 108) using, for example, the BLE communication circuitry 122 and, upon detection of the mobile device 108, the UWB accessory device 106 may initialize its UWB communication circuitry 124 to perform UWB ranging and determine the location of the mobile device 108 (e.g., relative to the UWB accessory device 106). In doing so, it should be appreciated that the UWB ranging may accurately and precisely determine a distance and angle of the mobile device 108 relative to the UWB accessory device 106. Further, it should be appreciated that the use of the UWB accessory device 106 in the access control system 100 allows for UWB ranging to be performed in conjunction with access control devices 102 that do not include UWB circuitry without updating the circuitry of the access control devices 102 (e.g., as a "retrofit" access control architecture). The access control system 100 may further authenticate a credential of the mobile device 108 and, in response to successful authentication and a determination that the user intends to access the passageway (e.g., based on the UWB ranging), the access control system 100 may automatically provide the user access through the passageway. For example, the access control system 100 or, the access control device 102 in particular, may automatically unlock and/or open a barrier securing the passageway in response to successful authentication and confirmed user intent to access the passageway. Depending on the particular embodiment, the authentication of the credential may include ensuring that the credential is a valid credential and/or ensuring that the credential (or user thereof) is authorized to access the passageway. In some embodiments, it should be appreciated that one or more features associated with intent detection (e.g., UWB ranging) may not occur until the credential has been authenticated.

It should be appreciated that the access control device 102, the management system 104, the UWB accessory device 106, the mobile device 108, the management server 110, the gateway device 112, and/or the access control panel 114 may be embodied as any type of device or collection of devices suitable for performing the functions described herein.

More specifically, in the illustrative embodiment, the access control device 102 may be embodied as any type of device capable of controlling and/or facilitating access through a passageway (e.g., at least in part). For example, in various embodiments, the access control device 102 may be embodied as an electronic lock (e.g., a mortise lock, a cylindrical lock, or a tubular lock), an exit device (e.g., a pushbar or pushpad exit device), a door operator, an auto-operator, a motorized latch/bolt (e.g., for a sliding door), a barrier control device (e.g., battery-powered), or a peripheral controller of a barrier to a passageway. Accordingly, in some embodiments, the access control device 102 may include a lock mechanism configured to be positioned in a locked state in which access to the passageway is denied or in an unlocked state in which access to the passageway is permitted. In some embodiments, the lock mechanism includes a deadbolt, latch bolt, lever, and/or other mechanism adapted to move between the locked and unlocked state and otherwise perform the functions described herein. However, it should be appreciated that the lock mechanism may be embodied as any other mechanism suitable for controlling access through a passageway in other embodiments.

As shown, in the illustrative embodiment, the access control device 102 includes the BLE communication circuitry 120, which enables the access control device 102 to establish BLE communication connections with other BLE-enabled devices and communicate with such devices over one or more BLE (or other Bluetooth) communication protocols.

Depending on the particular embodiment, the access control device 102 may include a credential reader or be electrically/communicatively coupled to a credential reader configured to communicative with credentials. In some embodiments, the access control device 102 may have an access control database stored thereon for locally performing access control decisions associated with user access. Accordingly, in such embodiments, the access control database may store credential data, biometric data, historical information, PINs, passcodes, and/or other relevant authentication data associated with users. In other embodiments, such data or a portion thereof may be stored in a centralized access control database (e.g., hosted by and/or accessible to the management server 110). Further, in other embodiments, the UWB accessory device 106 may be configured to authenticate credentials and, therefore, the access control database may be stored on and/or accessible to the UWB accessory device 106 in such embodiments. In some embodiments, the credentials may be stored on, or embodied as, the mobile device 108. For example, in some embodiments, one or more of the credentials may be embodied as a virtual credential (e.g., a Bluetooth/BLE transmitted credential) stored on the mobile device 108 and/or other computing device of a particular user.

Further, in some embodiments, the access control device 102 may also be configured to process one or more "passive" credentials powered by radio frequency (RF) signals received from a credential reader (e.g., credential cards). In other words, such passive credentials do not have an independent power source but, instead, rely on power that is induced from RF signals transmitted from other devices in the vicinity of the credential. In particular, in some embodiments, one or more of the passive credentials may be embodied as a proximity card, which is configured to communicate over a low frequency carrier of nominally 125 kHz, and/or a smartcard, which is configured to communicate over a high frequency carrier frequency of nominally 13.56 MHz.

As described herein, the management system 104 may be configured to manage credentials of the access control system 100. For example, depending on the particular embodiment, the management system 104 may be responsible for ensuring that access control devices 102 have updated authorized credentials, whitelists, blacklists, device parameters, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a mobile device 108, a management server 110, a gateway device 112, and/or an access control panel 114 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the access control device 102 and/or the UWB accessory device 106 such that one or more of the devices of the management system 104 (e.g., the mobile device 108, the management server 110, and/or the access control panel 114) may communicate with the access control device 102 and/or the UWB accessory device 106 via the gateway device 112.

In some embodiments, the access control device 102 may communicate with the management server 110 over a Wi-Fi connection and/or with the mobile device 108 over a Bluetooth (e.g., BLE) connection. Additionally, the access control device 102 may communicate with the management server 110 and/or the access control panel 114 via the gateway device 112. As such, in the illustrative embodiment, the access control device 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that the access control device 102 may communicate with the management server 110 via an online mode with a persistent real-time communication connection or via an offline mode (e.g., periodically or in response to an appropriate condition) depending on the particular embodiment (e.g., depending on whether the particular access control device 102 is offline). As indicated above, in other embodiments, it should be appreciated that the access control device 102 may communicate with the devices of the management system 104 via one or more other suitable communication protocols.

It should be further appreciated that, although the management system 104 and the management server 110 are described herein as one or more computing devices outside of a cloud computing environment, in other embodiments, the system 104 and/or server 110 may be embodied as, or include, a cloud-based device or collection of devices. Further, in cloud-based embodiments, the system 104 and/or server 110 may be embodied as a server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lambda functions, Azure functions, Google cloud functions, and/or other suitable cloud/virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 110), the appropriate virtual function(s) may be executed to perform the actions before eliminating the instance of the virtual function(s).

The UWB accessory device 106 may be embodied as any UWB-enabled device configured to perform UWB ranging to identify the relative location of nearby mobile devices 108 and otherwise configured to perform the functions described herein. For example, in various embodiments, the UWB accessory device 106 may be embodied as a doorbell device, floodlight or lightbulb device, camera device, speaker device, security device, sensor device, garage door opener device (e.g., exterior keypad), wall plug, standalone ranging device, and/or another device including UWB communication circuitry and communicatively coupled to the access control device 102. In the illustrative embodiment, the UWB accessory device 106 is stationary and positioned in the same geometric plane as the access control device 102 when the barrier is secured/closed (e.g., nearby the access control device 102). For example, in some embodiments, the access control device 102 may be embodied as an electronic lock secured to a door, and the UWB accessory device 106 may be positioned on the wall that defines the passageway secured by the door. Further, it should be appreciated that the UWB accessory device 106 may have a similar "line of sight" of the access control device 102. In some embodiments, the UWB accessory device 106 may be embodied as an "accessory" device in the sense that the UWB accessory device 106 may provide UWB ranging functionality for location/intent determination for a non-UWB access control device 102 without requiring a modification to the communication circuitry and/or other hardware of the non-UWB access control device 102. In some embodiments, the UWB accessory device 106 may have a primary intended function unrelated to, or not specifically related to, controlling access to a passageway (e.g., lighting, doorbell, camera, speaker, etc.).

Depending on the particular embodiment, the UWB accessory device 106 may be powered by an independent, untethered, and portable power source (e.g., one or more batteries, battery packs, capacitors, super capacitors, solar cells, and/or other power supplies) and/or powered by an electrical connection to a remote power supply (e.g., line power, low voltage electrical connections, Power-over-Ethernet (PoE), etc.). In particular, because the UWB accessory device 106 may be positioned off the barrier, in some embodiments, the UWB accessory device 106 may utilize a rechargeable battery supply and/or rechargeable batteries (e.g., lithium ion batteries) without negatively affecting the fire rating of the access control device 102 and/or the barrier.

As shown, the illustrative UWB accessory device 106 includes the BLE communication circuitry 122 and the UWB communication circuitry 124. It should be appreciated that the UWB accessory device 106 may leverage the UWB communication circuitry 124 to perform UWB ranging in order to determine the distance of a person (via their corresponding UWB-enabled mobile device 108) relative to the access control device 102 and/or other reference point (e.g., by virtue of the relative distance to the UWB accessory device 106 and static or predetermined geometric relationships to the access control device 102 or other reference points), determine the speed and/or direction of travel of the person, determine the angle of approach/arrival of the person relative to the access control device 102 and/or other reference (e.g., by virtue of the relative distance to the UWB accessory device 106 and static or predetermined geometric relationships to the access control device 102 or other reference points), and/or perform other UWB ranging functionalities.

The BLE communication circuitry 122 enables the UWB accessory device 106 to establish BLE communication connections with other BLE-enabled devices and communicate with such devices over one or more BLE (or other Bluetooth) communication protocols. For example, as described herein, the UWB accessory device 106 may be configured to communicate with both the mobile device 108 and the access control device 102 via BLE, Bluetooth, and/or another communication protocol. As described herein, UWB ranging techniques may be used in conjunction with a wireless credential (e.g., a BLE credential) for accurate and precise intent determinations and access control decisions. For example, as described herein, the UWB accessory device 106 may utilize UWB ranging techniques via the UWB communication circuitry 124 for intent-based determinations and utilize the BLE communication circuitry 122 to establish one or more secondary/second communication channels for the transmission of credentials, instructions, commands, and/or other access control payloads.

It should be appreciated that the mobile device 108 may be embodied as any type of UWB-enabled mobile communication device configured to communicate via BLE/Bluetooth and/or another secondary communication protocol (e.g., ZigBee, Wi-Fi, Z-wave, NFC, Thread, Matter, HomeKit, etc.) and otherwise perform the functions described herein. For example, in the illustrative embodiment, the mobile device 108 includes the BLE communication circuitry 126 and the UWB communication circuitry 128 and may be embodied as a smartphone. It should be appreciated that the BLE communication circuitry 126 and the UWB communication circuitry 128 enable respective communications with the UWB accessory device 106. Further, in some embodiments, the mobile device 108 may communicate directly with the access control device 102 via a BLE communication connection established between the mobile device 108 and the access control device 102.

Although the illustrative embodiment describes the access control system 100 using Bluetooth/BLE communication as a secondary/second communication protocol/technology (e.g., in addition to UWB ranging), it should be appreciated that the access control system 100 may utilize another communication protocol/technology as the secondary/second communication protocol/technology in other embodiments. For example, in addition or in the alternative to Bluetooth/BLE, the access control system 100 (and therefore the access control device 102) may utilize one or more of ZigBee communication, Z-wave communication, Wi-Fi communication, NFC communication, Thread communication, Matter communication, and/or other wireless communication suitable for access control, and therefore the corresponding devices of the access control system 100 (e.g., the access control device 102, the UWB accessory device 106, and/or the mobile device 108) may have the corresponding relevant communication circuitry.

In some embodiments, it should be appreciated that the access control system 100 may include one or more sensors configured to generate sensor data (e.g., by virtue of one or more signals), which may be interpreted by a corresponding processor (e.g., of the access control device 102, the UWB accessory device 106, and/or the management system 104) to determine one or more characteristics associated with the passageway, barrier, other device(s) of the access control system 100, and/or the environment thereof. By way of example, the sensors may detect various characteristics of the physical environment, electrical characteristics of the access control device 102 and/or the UWB accessory device 106, electromagnetic characteristics of the access control device 102 and/or the UWB accessory device 106 (or their surroundings), and/or other suitable characteristics. For example, in various embodiments, the sensors may be embodied as, or otherwise include, inertial sensors (e.g., accelerometers, gyroscopes, etc.), environmental sensors (e.g., air pressure sensors, humidity sensors, light sensors, etc.), proximity sensors, optical sensors, electromagnetic sensors (e.g., magnetometers), hall effect sensors, audio sensors (e.g., microphones), temperature sensors, motion sensor, piezoelectric sensors, cameras, antennas, communication circuitry, micro switches, tamper sensors, barrier position sensors, latch sensors, and/or other types of sensors. In particular, in some embodiments, the sensors may include a door position sensor/switch configured to generate sensor data (e.g., by virtue of one or more signals) associated with a door position status, which may be interpreted by the access control device 102, the management system 104, the UWB accessory device 106, and/or another device of the system 100 to determine whether the door is in a closed position or an open position (and/or a position therebetween), and/or a latchbolt sensor configured to generate sensor data (e.g., by virtue of one or more signals) associated with a latchbolt status, which may be interpreted by the access control device 102, the management system 104, the UWB accessory device 106, and/or another device of the system 100 to determine whether the latchbolt is in an extended position or a retracted position.

It should be appreciated that each of the access control device 102, the management system 104, the UWB accessory device 106, the mobile device 108, the management server 110, the gateway device 112, and/or the access control panel 114 may be embodied as one or more computing devices similar to the computing device 200 described below in reference to FIG. 2. For example, each of the access control device 102, the management system 104, the UWB device 106, the mobile device 108, the management server 110, the gateway device 112, and the access control panel 114 may include a processing device 202 and a memory 206 having stored thereon operating logic 208 for execution by the processing device 202 for operation of the corresponding device.

Although only one access control device 102, one management system 104, one UWB accessory device 106, one mobile device 108, one management server 110, one gateway device 112, and one access control panel 114 are shown in the illustrative embodiment of FIG. 1, the system 100 may include multiple access control devices 102, management systems 104, UWB accessory devices 106, mobile devices 108, management servers 110, gateway devices 112, and/or access control panels 114 in other embodiments. For example, as indicated above, the server 110 may be embodied as multiple servers in a cloud computing environment in some embodiments. Further, each user may be associated with a different mobile device 108 (and different credential) in some embodiments.

Figure 2:
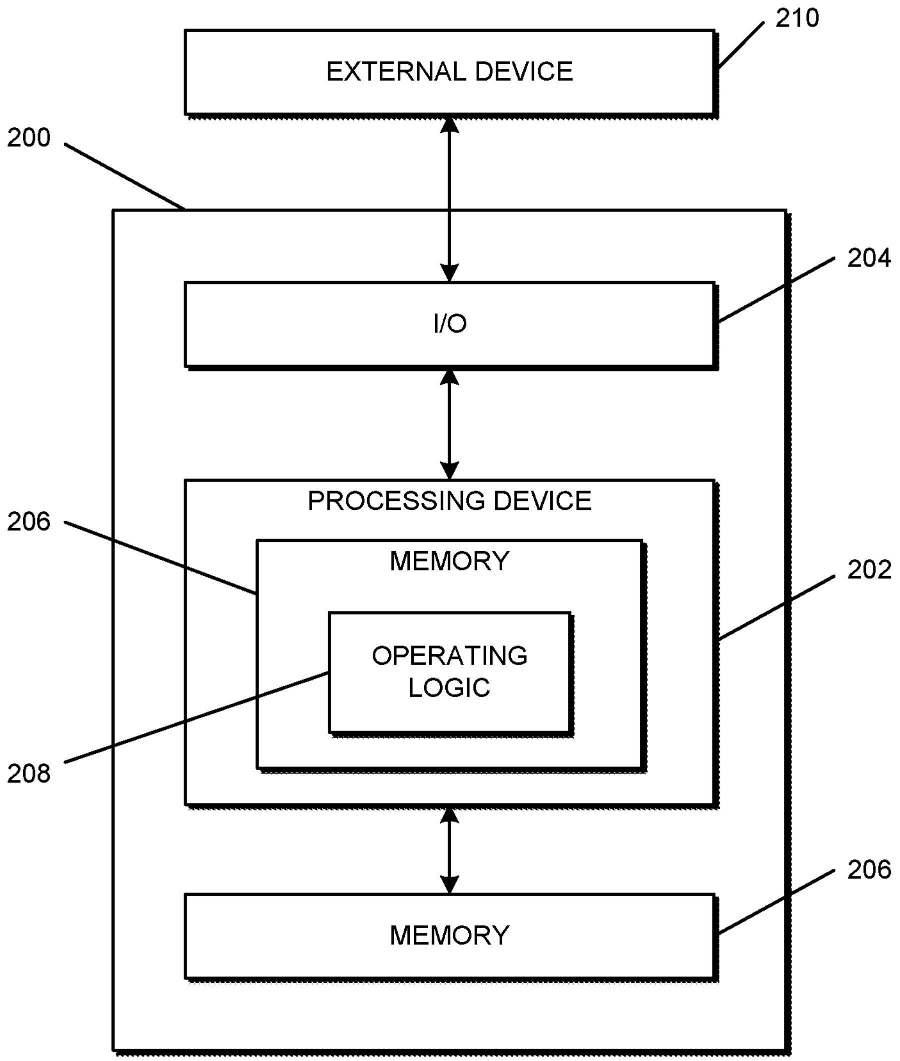
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device 102, management system 104, UWB accessory device 106, mobile device 108, management server 110, gateway device 112, and/or access control panel 114 illustrated in FIG. 1. Depending on the particular embodiment, computing device 200 may be embodied as a reader device, access control device, server, desktop computer, laptop computer, tablet computer, notebook, netbook, Ultrabook™, mobile computing device, cellular phone, smartphone, wearable computing device, personal digital assistant, Internet of Things (IoT) device, monitoring device, camera device, speaker device, UWB ranging device, doorbell device, floodlight or lightbulb device, security device, garage door device, wall plug, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port (e.g., RS-232, RS-485, CAN bus), parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet (e.g., including PoE), Bluetooth® (e.g., including BLE), Wi-Fi®, WiMAX, ZigBee, Z-Wave, NFC, Thread, Matter, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the UWB accessory device 106, the mobile device 108, the management server 110, the gateway device 112, and/or the access control panel 114. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

As used herein, "Bluetooth" includes traditional Bluetooth Basic Rate/Enhanced Rate (BR/EDR) technology and Bluetooth Low Energy (BLE) technology and refers to one or more components, architectures, communication protocols, and/or other systems, structures, or processes defined by and/or compliant with one or more Bluetooth specifications, addendums, and/or supplements overseen by the Bluetooth Special Interest Group (SIG) including, for example, active, legacy, withdrawn, deprecated, and/or subsequently introduced Bluetooth Core Specifications (CSs) (Bluetooth CS Version 1.0B, Bluetooth CS Version 1.1, Bluetooth CS Version 1.2, Bluetooth CS Version 2.0+EDR, Bluetooth CS Version 2.1+EDR, Bluetooth CS Version 3.0+HS, Bluetooth CS Version 4.0, Bluetooth CS Version 4.1, Bluetooth CS Version 4.2, Bluetooth CS Version 5.0); active, legacy, withdrawn, deprecated, and/or subsequently introduced Bluetooth Core Specification Addendums (CSAs) (Bluetooth CSA Version 1, Bluetooth CSA Version 2, Bluetooth CSA Version 3, Bluetooth CSA Version 4, Bluetooth CSA Version 5, Bluetooth CSA Version 6); Bluetooth Core Specification Supplements (CSSs) (Bluetooth CSS Version 1, Bluetooth CSS Version 2, Bluetooth CSS Version 3, Bluetooth CSS Version 4, Bluetooth CSS Version 5, Bluetooth CSS Version 6, Bluetooth CSS Version 7); active, legacy, withdrawn, deprecated, and/or subsequently introduced Bluetooth Mesh Networking Specifications (Bluetooth Mesh Profile Specification 1.0, Bluetooth Mesh Model Specification 1.0, Bluetooth Mesh Device Properties 1.0); active, legacy, withdrawn, deprecated, and/or subsequently introduced Bluetooth Traditional Profile Specifications (3DSP, A2DP, AVRCP, BIP, BPP, CTN, DI, DUN, FTP, GAVDP, GNSS, GOEP, GPP, HCRP, HDP, HFP, HID, HSP, MAP, MPS, OPP, PAN, PBAP, SAP, SPP, SYNCH, VDP); active, legacy, withdrawn, deprecated, and/or subsequently introduced Bluetooth Protocol Specifications (AVCTP, AVDTP, BNEP, IrDA, MCAP, RFCOMM, 3WIRE, SD, TCP, UART, USB, WAPB); active, legacy, withdrawn, deprecated, and/or subsequently introduced Bluetooth Generic Attribute Profile (GATT) services, characteristics, declarations, descriptors, and profiles (ANP, ANS, AIOP, AIOS, BAS, BCS, BLP, BLS, BMS, CGMP, CGMS, CPP, CPS, CSCP, CSCS, CTS, DIS, ESP, ESS, FMP, FTMP, FTMS, GSS, GLP, GLS, HIDS, HOGP, HPS, HRP, HRS, HTP, HTS, IAS, IDP, IDS, IPS, IPSP, LLS, LNP, LNS, NDCS, OTP, OTS, PASP, PASS, PXP, PLXP, PLXS, RCP, RCS, RSCP, RSCS, TRUS, ScPP, ScPS, TDS, TIP, TPS, UDS, WSP, WSS); and/or other Bluetooth specifications, addendums, and/or supplements.

Figure 3:
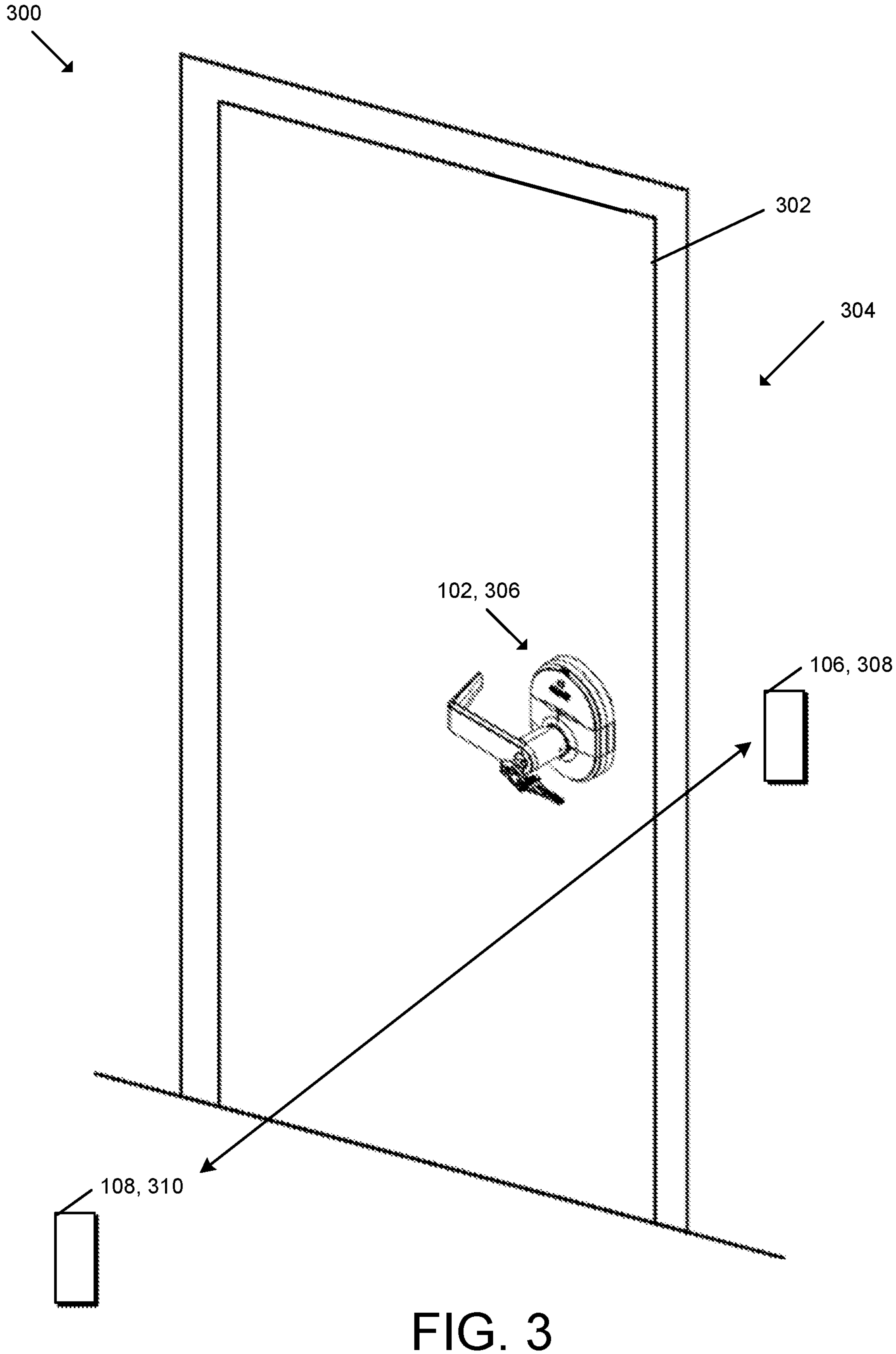
FIG. 3 is a simplified diagram of at least one embodiment of an exterior side of an access-controlled passageway.

Referring now to FIG. 3, a moveable barrier 302 selectively prevents passage of users through a passageway 304 formed in a wall. An exterior side 300 and an interior side (not shown) are defined relative to the barrier 302 and the passageway 304. In some embodiments, it should be appreciated that the exterior side 300 of the barrier 302 corresponds with an unsecured, or less secured, region and the interior side of the barrier 302 corresponds with a secured, or more secured, region. Although the barrier 302 is depicted as a hinged door in the illustrative embodiment of FIG. 3, it should be appreciated that the barrier 302 may be embodied as an otherwise moveable barrier (e.g., a sliding door) and/or a different type of barrier (e.g., a gate) in other embodiments. Similarly, although the barrier 302 is illustratively depicted as a perimeter door, it should be appreciated that the barrier 302 may be embodied as an interior door (e.g., an office door or conference room door) in other embodiments.

As shown in the illustrative embodiment of FIG. 3, an access control device 102 is secured to the exterior side 300 of the barrier 302 and is illustratively depicted as an electronic lockset 306 (i.e., electronic lock). In the illustrative embodiment, the electronic lockset 306 may include a credential reader configured to read physical and/or virtual credentials, for example, via RF, NFC, Wi-Fi, Bluetooth/BLE, and/or other communication signals. Further, in the illustrative embodiment, a UWB accessory device 106 is positioned exterior to the barrier 302. More specifically, the UWB accessory device 106 may be embodied as a wall-mounted UWB accessory device 106, 308. For example, in some embodiments, the wall-mounted UWB accessory device 106, 308 may be embodied as a doorbell device, floodlight or lightbulb device, camera device, speaker device, security device, sensor device, garage door opener device (e.g., exterior keypad), wall plug, standalone ranging device, and/or another UWB-enabled device. It should be further appreciated that although FIG. 3 depicts the UWB accessory device 106 as a wall-mounted UWB accessory device 308, the UWB accessory device 106 described herein may be mounted, secured, and/or positioned in any manner suitable for performing the functions described herein.

In the illustrative embodiment, the mobile device 108 is embodied as a UWB-enabled smartphone 310 such that the wall-mounted UWB accessory device 106, 308 can communicate with the mobile device 108, 310 for UWB ranging to determine the relative location of the mobile device 108, 310 relative to the UWB accessory device 106, 308.

Figure 4:
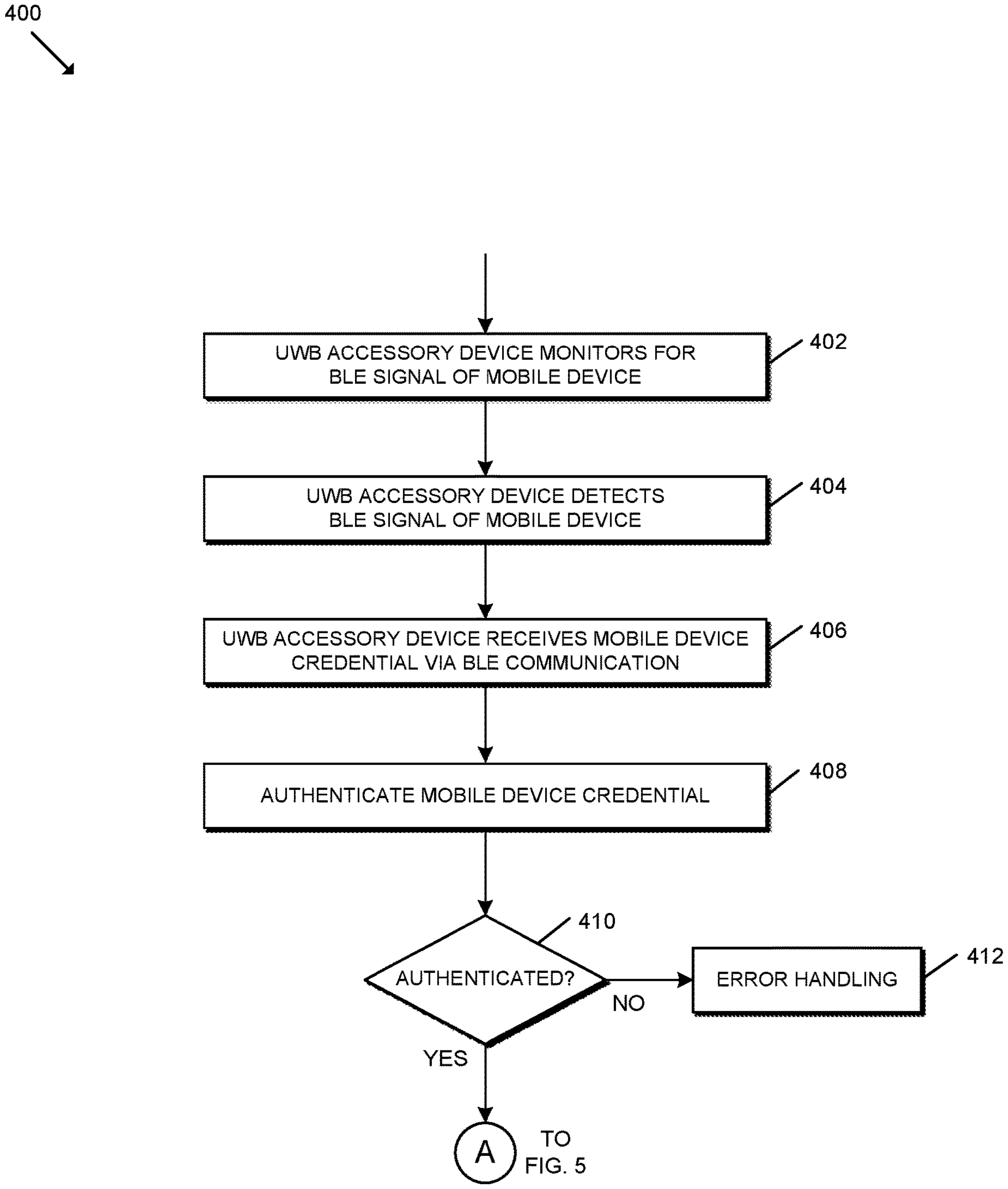
FIGS. 4-5 are a simplified flow diagram of at least one embodiment of a method for UWB-based radio frequency intent detection.
Figure 5:
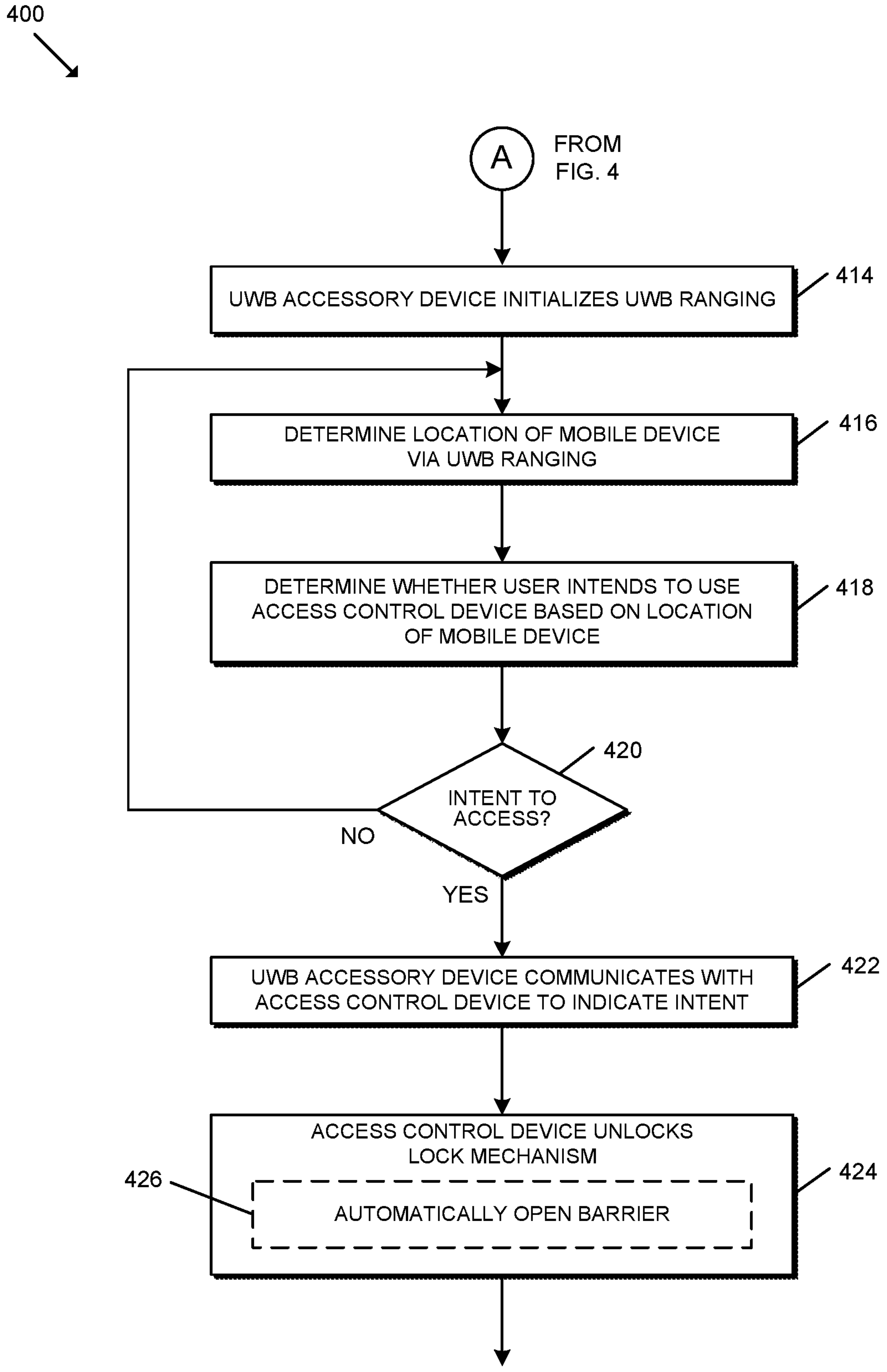

Referring now to FIGS. 4-5, in use, the access control system 100 may execute a method 400 for UWB-based radio frequency intent detection. It should be appreciated that the particular blocks of the method 400 are illustrated by way of example, and such blocks may be combined or divided, added or removed, and/or reordered in whole or in part depending on the particular embodiment, unless stated to the contrary. Although the method 400 describes the use of Bluetooth/BLE communication in conjunction with UWB communication, it should be appreciated that UWB communication may be used in conjunction with another secondary communication protocol in another embodiment of the method 400 (e.g., ZigBee, Z-Wave, Wi-Fi, NFC, Thread, Matter, etc.).

The illustrative method 400 begins with block 402 of FIG. 4 in which the UWB accessory device 106 monitors for a mobile device 108 nearby the UWB accessory device 106. In doing so, the UWB accessory device 106 may be attempting to ascertain which mobile devices 108 may be close enough to the UWB accessory device 106 (e.g., and implicitly the access control device 102) that the user of the mobile device 108 may potentially intend to access the passageway secured by the access control device 102. For example, in the illustrative embodiment, the UWB accessory device 106 may monitor for one or more Bluetooth/BLE advertisements, messages, or signals to be received from a mobile device 108 within a communication range of the UWB accessory device 106. In some embodiments, the UWB accessory device 106 may advertise itself (e.g., via Bluetooth/BLE or another suitable communication protocol) and await a response from a mobile device 108 within communication range of the UWB accessory device 106. In other embodiments, it should be appreciated that the UWB accessory device 106 may monitor for mobile devices 108 within some distance less than the maximum communication range of the relevant protocol (e.g., Bluetooth/BLE).

In block 404, the UWB accessory device 106 detects the Bluetooth/BLE signal of the nearby mobile device 108, and in block 406, the UWB accessory device 106 receives a credential of the mobile device 108 over a Bluetooth/BLE communication connection established between the UWB accessory device 106 and the mobile device 108. In block 408, the UWB accessory device 106 authenticates the credential of the mobile device 108 received via the Bluetooth/BLE communication to determine whether the mobile device 108 and/or the user thereof is authorized to access the passageway (e.g., whether the user is authorized to control an access control mechanism of the access control device 102) and/or another aspect of the access control device 102 or system 100. Depending on the particular embodiment, it should be appreciated that the credential data may be processed by the UWB accessory device 106 that received the credential data, by the access control device 102, and/or by the management system 104 (e.g., at a host server, management server 110, and/or access control panel 114).

If the UWB accessory device 106 determines, in block 410, that the authentication was not successful (e.g., based on an improper credential), the method 400 advances to block 412 in which the access control system 100 handles the error using any suitable technique or mechanism. For example, in some embodiments, the access control system 100 may generate an audit, alert, and/or alarm related to the unsuccessful authentication.

If the UWB accessory device 106 determines, in block 410, that the authentication was successful, the method 400 advances to block 414 of FIG. 5 in which the UWB accessory device 106 initializes UWB ranging via the UWB communication circuitry 124, and in block 416, the UWB accessory device 106 determines/monitors the location of the mobile device 108 relative to the UWB accessory device 106 via the UWB communication circuitry 124. It should be appreciated that the UWB accessory device 106 may determine the location of the mobile device 108 relative to the access control device 102 based on the location of the mobile device 108 relative to the UWB accessory device 106 and known, predetermined, and/or determinable geometric relationships between the UWB accessory device 106 and the access control device 102. It should be further appreciated that the access control system 100 may define a set of locations and/or movements of the mobile device 108 that correspond with an intent of the corresponding user to access the passageway secured by the access control device 102. For example, in some embodiments, the mobile device 108 may be nearby the access control device 102 (e.g., within a certain distance, within a certain angle range, on the correct side of the passageway, etc.) such that it is indicative of the user's intent to access the passageway. In other embodiments, the mobile device 108 may be at the same location but moving away from the access control device 102, thereby indicating that the user does not intend to access the passageway. It should be appreciated that the UWB accessory device 106 may utilize any suitable intent algorithm for determining whether the user intends to access the passageway secured by the access control device 102 that is consistent with the techniques described herein.

In block 418, the UWB accessory device 106 determines whether the user intends to use the access control device 102 and/or otherwise access the passageway controlled by the access control device 102 based on the location and/or movement of the mobile device 108. If the UWB accessory device 106 determines, in block 420, that the location and/or movement of the mobile device 108 is not indicative of the user's intent to access the passageway secured by the access control device 102, the method 400 returns to block 416 in which the UWB accessory device 106 again determines the location of the mobile device 108 via UWB ranging. In other words, the UWB accessory device 106 may monitor the location/movement of the mobile device 108 over time as the mobile device 108 moves relative to the UWB accessory device 106 (e.g., and the access control device 102). In some embodiments, the method 400 may "timeout" if the location of the mobile device 108 does not become an "intent location" before the expiration of a predefined timeout period.

If the UWB accessory device 106 determines, in block 420, that the location/movement of the mobile device 108 is indicative of the user's intent to access the passageway, the method 400 advances to block 422 in which the UWB accessory device 106 communicates with the access control device 102 to indicate the intent of the user to access the passageway. Depending on the particular embodiment, the UWB accessory device 106 and/or the access control device 102 may make a relevant access control decision based on the intent of the user. For example, in some embodiments, the UWB accessory device 106 may communicate an indication of intent of the user to access to the access control device 102 for the access control device 102 to ultimately make the access control decision (e.g., using multi-factor authentication), whereas in other embodiments the indication of intent communicated to the access control device 102 may be in the form of an access control command or instruction to the access control device 102 (e.g., to unlock the lock mechanism without further analysis). In block 424, the access control device 102 controls a lock mechanism or other access control mechanism to unlock the lock mechanism and/or otherwise allow access through the passageway. Further, in block 426, the access control device 102 may automatically open the barrier. In other words, the access control device 102 automatically unlocks the barrier and/or automatically opens the barrier depending on the particular embodiment.

In other embodiments, instead of defaulting to a "locked" status, the access control device 102 may default to an "unlocked" status and, in conjunction with monitoring of persons/devices within the vicinity of the access control device 102 (e.g., via the UWB ranging and wireless credential processing), the access control device 102 may change to a "locked" status when an unauthorized person is approaching the controlled passageway in a manner determined to be indicative of an intent to access. As such, in some embodiments, the access control system 100 may reverse the traditional locked/unlocked security paradigm.

Although various features of the method 400 are described as being executed or performed by the UWB accessory device 106, it should be appreciated that one or more of those features may be executed or performed by another device of the access control system 100 in other embodiments. For example, in some embodiments, the access control device 102 is configured to authenticate the credential of the mobile device 108 (e.g., in response to receiving an indication from the UWB accessory device 106 that the mobile device 108 is in a location and/or movement pattern indicative of an intent to access the secured passageway). Further, in some embodiments, the mobile device 108 may perform the UWB ranging instead of the UWB accessory device 106 (e.g., by performing the UWB ranging and sending the ranging data back to the UWB accessory device 106), which would allow for offloading of computational power to the mobile device 108 that is potentially more computationally advanced, may have improved antennas, and/or may otherwise be better suited for such processing than the UWB accessory device 106.

Although the blocks 402-426 are described in a relatively serial manner, it should be appreciated that various blocks of the method 400 may be performed in parallel in some embodiments.

What is claimed is:

1. An access control system for ultra-wideband (UWB)-based radio frequency intent detection, the access control system comprising:

an electronic lock coupled to a barrier and including a first Bluetooth communication circuitry and a lock mechanism configured to secure access to a passageway; and a UWB accessory device comprising a UWB communication circuitry, a second Bluetooth communication circuitry, a processor, and a memory comprising a plurality of instructions stored thereon that, in response to execution by the processor, causes the UWB accessory device to:

receive, via the second Bluetooth communication circuitry, a credential of a mobile device;

determine, using UWB ranging via the UWB communication circuitry, a location of the mobile device relative to the passageway;

determine whether the user intends to access the passageway based on the determined location of the user relative to the passageway; and communicate, via a communication connection between the first Bluetooth communication circuitry and the second Bluetooth communication circuitry, an indication that the user intends to access the passageway to the electronic lock; and wherein the electronic lock is configured to unlock the lock mechanism in response to receipt of the indication that the user intends to access the passageway.

2. The access control system of claim 1, wherein to determine the location of the mobile device relative to the passageway comprises to determine the location of the mobile device relative to the UWB accessory device.

3. The access control system of claim 1, wherein the electronic lock is further configured to automatically open the barrier to permit access to the passageway in response to unlock of the lock mechanism.

4. The access control system of claim 1, wherein the plurality of instructions further causes the UWB accessory device to authenticate the credential of the mobile device in response to receipt of the credential from the mobile device.

5. The access control system of claim 1, wherein the electronic lock is configured to authenticate the credential of the mobile device.

6. The access control system of claim 1, wherein the plurality of instructions further causes the UWB accessory device to monitor for a Bluetooth communication signal from the mobile device; and wherein to receive the credential of the mobile device is in response to detecting the Bluetooth communication signal from the mobile device.

7. The access control system of claim 6, wherein the plurality of instructions further causes the UWB accessory device to initialize UWB ranging of the UWB communication circuitry to determine the location of the mobile device relative to the UWB accessory device in response to detection of the Bluetooth communication signal from the mobile device.

8. The access control system of claim 1, wherein the UWB accessory device is stationary and positioned in a same geometric plane as the electronic lock.

9. The access control system of claim 1, wherein the UWB accessory device is a standalone ranging device.

10. The access control system of claim 1, wherein the UWB accessory device comprises a doorbell.

11. The access control system of claim 1, wherein the UWB accessory device comprises a camera.

12. The accessory control system of claim 1, wherein the UWB accessory device comprises a door position sensor.

13. A method for ultra-wideband (UWB)-based radio frequency intent detection, the method comprising:

receiving a credential of a mobile device via Bluetooth communication;

determining, using UWB ranging of a UWB accessory device, a location of the mobile device relative to a passageway secured by a lock mechanism of an access control device;

determining whether a user of the mobile device intends to access the passageway based on the determined location of the user relative to the passageway; and communicating an indication that the user intends to access the passageway from the UWB accessory device to the electronic lock via Bluetooth communication.

14. The method of claim 13, further comprising unlocking, by the access control device, the lock mechanism in response to receiving the indication that the user intends to access the passageway.

15. The method of claim 14, further comprising automatically opening a barrier to permit access to the passageway in response to unlocking the lock mechanism.

16. The method of claim 13, further comprising authenticating the credential of the mobile device in response to receiving the credential from the mobile device.

17. The method of claim 13, further comprising monitoring for a Bluetooth communication signal from the mobile device; and wherein receiving the credential of the mobile device comprises receiving the credential of the mobile device in response to detecting the Bluetooth communication signal from the mobile device.

18. The access control system of claim 17, further comprising initializing UWB ranging of the UWB accessory device to determine the location of the mobile device relative to the UWB accessory device in response to detecting the Bluetooth communication signal from the mobile device.

19. A system for ultra-wideband (UWB)-based radio frequency intent detection, the system comprising:

an access control device comprising a lock mechanism configured to secure access to a passageway; and a UWB accessory device configured to (i) receive a credential of a mobile device via Bluetooth communication, (ii) determine, using UWB ranging of the UWB accessory device, a location of the mobile device relative to the passageway secured by the lock mechanism of the access control device, (iii) determine whether a user of the mobile device intends to access the passageway based on the determined location of the user relative to the passageway, and (iv) communicate an indication that the user intends to access the passageway to the electronic lock via Bluetooth communication; and wherein the access control device is configured to unlock the lock mechanism in response to the indication that the user intends to access the passageway.

20. The system of claim 19, wherein the UWB accessory device is further configured to (i) monitor for a Bluetooth communication signal from the mobile device, wherein to receive the credential of the mobile device is in response to detecting the Bluetooth communication signal from the mobile device and (ii) initialize UWB ranging of the UWB accessory device to determine the location of the mobile device relative to the UWB accessory device in response to detection of the Bluetooth communication signal from the mobile device.

* * * * *